Figure 1:
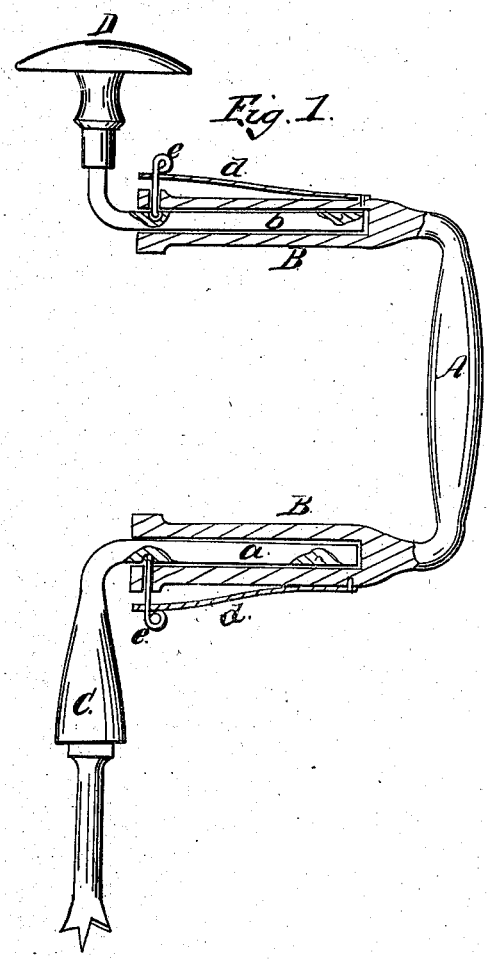

G. Richards,
Bit Stock,
No. 83,410. Patented Oct. 27, 1868.

Witnesses
Wm A Morgan
G. C. Cotton

Inventor.
G. Richard
per Munn & Co
Attorneys

United States Patent Office.

GEORGE RICHARDS, OF RICHLAND CENTRE, WISCONSIN, ASSIGNOR TO HIMSELF AND DEXTER E. PEASE, OF SAME PLACE.

Letters Patent No. 83,410, dated October 27, 1868.

IMPROVEMENT IN BIT-STOCKS.

The Schedule referred to in these Letters Patent and making part of the same.

To all whom it may concern:

Be it known that I, GEORGE RICHARDS, of Richland Centre, in the county of Richland, and State of Wisconsin, have invented a new and useful Improvement in Bit-Stocks; and I do hereby declare that the following is a full, clear, and exact description thereof, which will enable others skilled in the art to make and use the same, reference being had to the accompanying drawings, forming part of this specification, in which—

Figure 1 is a sectional side view of my improved bit-stock or brace.

Similar letters of reference indicate like parts.

The object of this invention is to provide a brace or bit-stock, the handle of which is extensible both from the bit-holder and rest.

This I accomplish, by forming the stock in three separate pieces, and uniting them in such a manner that the grasp or handle can be extended at will.

In the accompanying drawings, the handle A is provided with hollow sockets, B, within which the shanks $a$ and $b$ of the holder C and rest D respectively fit with easy contact.

The springs $d\ d$ are affixed to the sockets, and provided with pins, $e\ e$, which pass through the sockets and enter into holes or indentures in the shanks, as shown, for the purpose of holding the three parts firmly together.

Having thus described my invention,

I claim as new, and desire to secure by Letters Patent—

The handle A, provided with the sockets B B, to receive adjustably both the shank $b$ of the rest D and the shank $a$ of the tool-holder C, whereby the leverage of the handle is adjusted equally from the rest and tool-holder, as herein shown and described.

GEORGE RICHARDS.

Witnesses:
H. A. EASTLAND,
M. V. DUSTIN.